L. C. CONNER.
EXPLOSIVE ENGINE.
APPLICATION FILED AUG. 16, 1912.
1,119,347.
Patented Dec. 1, 1914.
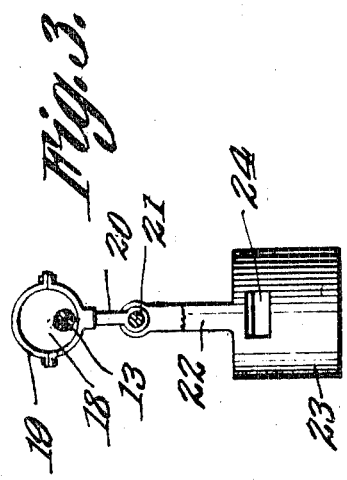
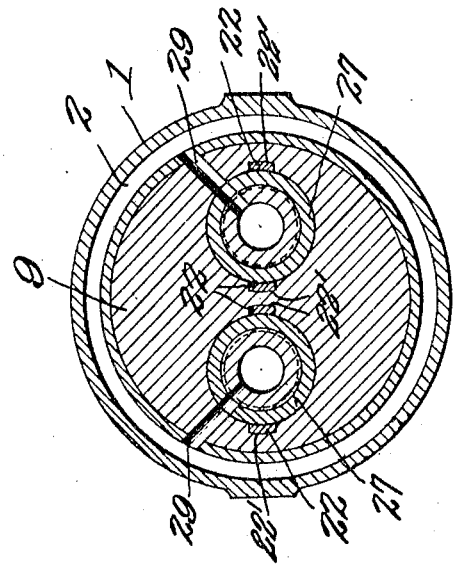
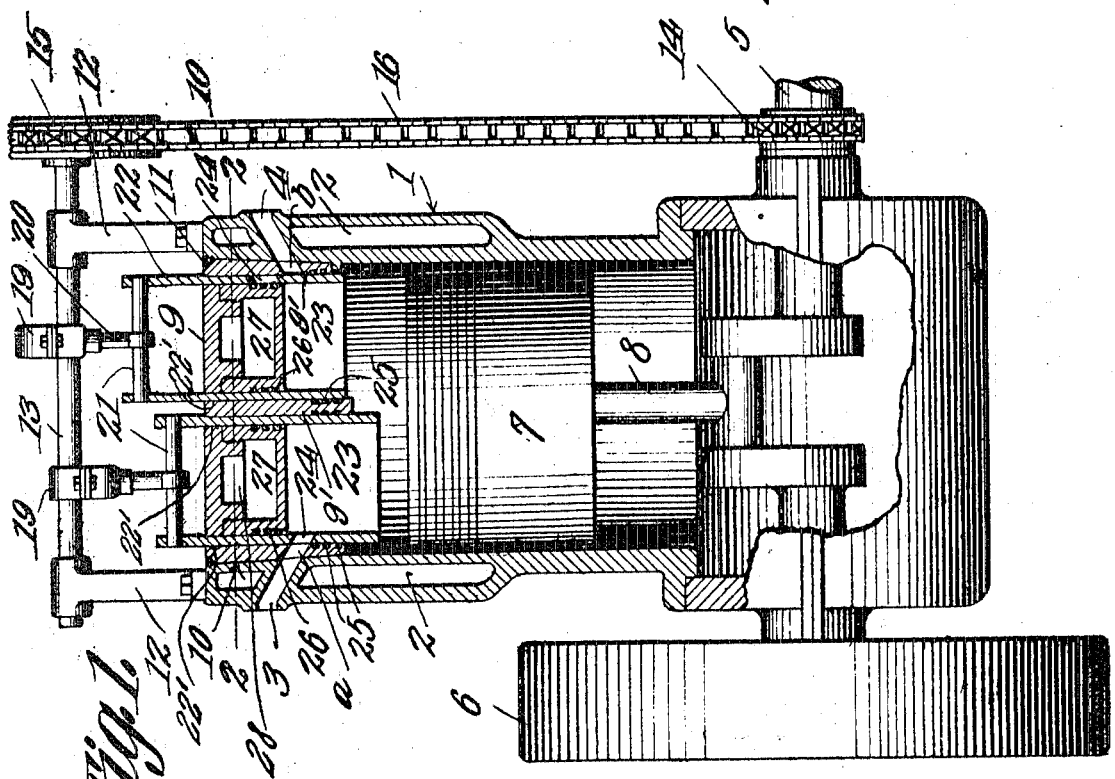
Witnesses
F. B. Wooders.
L. H. Wilson.
Louis C. Conner, Inventor,
by C. A. Snow & Co.
Attorneys.

UNITED STATES PATENT OFFICE.

LOUIS C. CONNER, OF FORT WORTH, TEXAS, ASSIGNOR TO C. C. BRADFORD, OF FORT WORTH, TEXAS.

EXPLOSIVE-ENGINE.

1,119,347. Specification of Letters Patent. Patented Dec. 1, 1914.

Application filed August 16, 1912. Serial No. 715,487.

*To all whom it may concern:*

Be it known that I, LOUIS C. CONNER, a citizen of the United States, residing at Fort Worth, in the county of Tarrant and State of Texas, have invented a new and useful Explosive-Engine, of which the following is a specification.

This invention relates to explosive engines and has for its object the making of such engines more durable, rendering the construction simpler and easier to effect.

The invention also relates to improvement of the valve controlling mechanism and the valves themselves.

With the objects above enumerated in view and other objects, which will appear as the invention is more fully disclosed, the invention consists in the improved structure of an explosion engine illustrated in the accompanying drawings, it being understood that changes may be made therein within the scope of the appended claims without departing from the spirit of the invention.

In the drawings: Figure 1 is a view in vertical section of a one cylinder engine embodying the present invention. Fig. 2 is a horizontal section on the line 2—2 of Fig. 1 and Fig. 3 is a detail view illustrating one of the valve pistons.

Referring to the drawings, 1 designates the cylinder of the engine. This engine is preferably provided with a water jacket 2 in the cylinder near the upper end and also is provided with passages 3 and 4 for the inlet and outlet of the gas. In the lower part of the engine is mounted a crank shaft 5 of the usual construction and which is provided with a fly-wheel 6 and is connected to a piston 7 by means of a connecting rod 8.

The cylinder is provided with a closing end or head 9, which slightly tapers from its outer face toward its inner end, as clearly shown in Fig. 1, the external surface 10 of the end of the head being round or otherwise accurately formed. The head 9 is fitted into the upper end of the cylinder and secured therein by means of a screw threaded retaining ring 11, which is engaged with suitable screw threads in the outer extremity of the cylinder, as shown.

Arranged within the recesses 9' of the head 9 of the engine and to control the inlet and outlet of gas to and from the ports $a$ and $b$ and the passages 3 and 4 leading to and from said ports are a plurality of valves 23, which are operated from the eccentrics 18 on shaft 13 which is arranged directly above the end of the cylinder in bearings 12 provided therefor. Movement is imparted to the shaft 13 from the crank shaft 5 by means of sprockets 14 and 15 and a suitable endless chain 16 which revolves around them. The gear 15 on the shaft 13 is twice as large as the gear 14 on the shaft 5, so that the inlet and outlet will take place at the proper time. Attached to the shaft 13 and operated thereby are a plurality of valve actuating members 18, which are so arranged that proper action of the valves results. Arranged around the members 18, are straps 19, which are in turn connected with rods 20 which extend from the exterior of the straps 19 to the rods 21 mounted in the upper end of the two plates 22 of each of the hollow cylindrical valves 23. In each of the valves 23 is formed a port 24 which extends inward as shown. The valves 23 which are arranged for reciprocation in the two cylindrical bores of the head 9 of the cylinder, control the inlet of the charge and outlet of the burnt gases. When the left valve 23 is down in the position shown in Fig. 1 and the piston 8 is on its downward movement gas will be allowed to pass in through the inlet port 3 as soon as the port 24 of the valve is in registration with the port 3. As soon as the cylinder has received its charge of gas the left valve 23 will ascend, closing the inlet port 3 and leave the cylinder filled with gas and ready for operation as hereinafter described.

After the filling of the cylinder with gas, the outward movement of the piston 7 to the outer end of the cylinder will result in the compression of the gas preparatory to its explosion. To prevent the escape of the charge during the outward movement of the piston 7, there is preferably provided the packing rings 25 at the inner ends and within the cylindrical bores of the heads 9. Similar packing rings 26 are placed on the exterior of each hollow plug 27. The plugs 27 are disposed concentrically within the hollow valves 23, and are supported from the threaded projections 28 provided at the upper ends of the valve receiving bores of the heads 9.

In order to provide a water jacketed means for cooling the interior of the plugs 27 and the portions 28 of the head 9, the ports 29 are led from the water jacket 2 of the cylinder.

With the parts in the position as shown in Fig. 1, with the left valve 23 having its port 24 in registration with the intake port 3 of the cylinder, a charge will be drawn into the chamber of the engine, upon the down or in-stroke of the power piston 7, the valve 23 being slightly elevated toward the end of the stroke so that upon the out or up-stroke of the piston 7, the ports 3 and 24 will be out of registration and the charge within the explosive chamber prevented egress during the compression and explosion of the charge. Upon the succeeding up-stroke, the valve 23 at the right will have been moved downwardly so that its port 24 is placed in registration with the exhaust port 4 of the engine, so that upon the succeeding up-stroke of the power piston 7, the charge of burnt gases will be properly expelled from the explosive chamber and thus produce in the operation of the piston 7, a four-cycle effect.

In assembling the parts of the present engine, a removable head 9 is provided with cylindrical bores into which the respective valves 23, the threaded socketed plug portions 28 being provided for the proper reception of the water jacket forming members or plugs 27, which when properly assembled provide a concentric chamber for the necessary movement of the cylindrical rim portion of the respective valves 23. The stems 22 of the valves 23 are of such a thickness as to be readily inserted through the concentric space from below the head 9 and through the two diametrically disposed slots 22′ formed in the head 9 and clearly illustrated in Fig. 2. By this means the portion of the head forming the core for the respective valves is rigid with the body of the head 9 and the valves 23 are permitted the necessary reciprocatory movement to produce the result desired. Any form of device for imparting the necessary reciprocation to the valves may be employed, the stems 22 being readily connected to the crank pins or rods 21 as clearly shown.

Having thus described my invention what I claim as new and desire to secure by Letters Patent is:

1. The combination with an explosive engine having an intake and exhaust port and a removable head, said head having two vertically disposed and independent sockets in its under side and two ports one to each socket for registration with intake and exhaust ports respectively of the cylinder, of a valve mechanism for controlling the ports, including two valves one for each socket and for controlling its port, each valve including a tubular member provided with a port in one wall thereof, and two stems slidably mounted in the head and projecting exteriorly thereof, and means for operating both valves operably connected to the stems thereof.

2. A valve mechanism for explosive engines, including a removable head having two parallel cylindrical sockets opening through the under side thereof, there being provided a port leading into each socket, two valves, each of said valves being a tubular member slidably mounted in its respective socket of the head to control the port and having two stems projecting through the head and exteriorly thereof, and means connected to the stems of both valves for imparting reciprocating motion thereto.

3. A valve mechanism for explosive engines, including a removable head having two parallel cylindrical sockets opening through the under side thereof, there being provided a port leading into each socket, two valves, each of said valves being a tubular member slidably mounted in its respective socket of the head and having two stems projecting through the head and exteriorly thereof, each valve being provided with a port to be placed in registration with its respective port of the head, and water jacket members at the closed end of the sockets and disposed within the valves in fixed relation to the head.

4. A valve for explosive engines, including a supporting member having a cylindrical socket therein open at one end and with a port leading from the socket intermediate of its ends, a hollow cylindrical member fitted in the socket and forming therewith a water jacket, a tubular valve slidably mounted in the socket and about the cylindrical member and having a port in the wall thereof for registration with the port in the supporting member, said supporting member being provided with two vertically disposed and diametrically placed slots leading from the inner end of the socket to the exterior, and two stems carried by the valve and extending through said slots and forming means whereby the valve is reciprocated.

In testimony that I claim the foregoing as my own, I have hereto affixed my signature in the presence of two witnesses.

LOUIS C. CONNER.

Witnesses:
SELINA WILLSON,
BAXTER NEWTON.